(12) United States Patent
Hattori et al.

(10) Patent No.: US 10,063,788 B2
(45) Date of Patent: Aug. 28, 2018

(54) NIGHT-VISION IMAGE PROCESSING APPARATUS

(71) Applicant: DENSO CORPORATION, Kariya, Aichi-pref. (JP)

(72) Inventors: Kazushige Hattori, Nagoya (JP); Hirotaka Suzuki, Toyota (JP); Nobuhiko Inoue, Nagoya (JP); Kazuhide Ohta, Hekinan (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 441 days.

(21) Appl. No.: 14/766,113

(22) PCT Filed: Feb. 6, 2014

(86) PCT No.: PCT/JP2014/000620
§ 371 (c)(1),
(2) Date: Aug. 5, 2015

(87) PCT Pub. No.: WO2014/122928
PCT Pub. Date: Aug. 14, 2014

(65) Prior Publication Data
US 2015/0373278 A1    Dec. 24, 2015

(30) Foreign Application Priority Data
Feb. 8, 2013 (JP) ................. 2013-023542

(51) Int. Cl.
*H04N 5/243* (2006.01)
*G02B 5/20* (2006.01)
(Continued)

(52) U.S. Cl.
CPC .............. *H04N 5/243* (2013.01); *B60R 1/00* (2013.01); *G02B 5/20* (2013.01); *G02B 5/208* (2013.01);
(Continued)

(58) Field of Classification Search
CPC .................. B60R 1/00; H04N 5/332
See application file for complete search history.

(56) References Cited

U.S. PATENT DOCUMENTS

| | | | |
|---|---|---|---|
| 2006/0171704 A1* | 8/2006 | Bingle | B60R 11/04 396/419 |
| 2010/0103268 A1 | 4/2010 | Tokuyama | |
| 2013/0002882 A1* | 1/2013 | Onozawa | H04N 5/2353 348/164 |

FOREIGN PATENT DOCUMENTS

| | | |
|---|---|---|
| JP | 2006-148690 A | 6/2006 |
| JP | 2007-282022 A | 10/2007 |

(Continued)

OTHER PUBLICATIONS

International Search Report and Written Opinion dated May 13, 2014 in the corresponding International Application No. PCT/JP2014/000620.

*Primary Examiner* — Zhubing Ren
(74) *Attorney, Agent, or Firm* — Knobbe, Martens, Olson & Bear, LLP

(57) ABSTRACT

An image processing apparatus includes an image acquirement section, a correction section, and an image production section. The image acquirement section acquires an image signal representing an image, the image signal is generated by light receiving elements that receive lights from a specific space preliminarily defined in a vicinity of a vehicle via a near infrared passing filter mainly transmitting near infrared lights and a visible light passing filter transmitting visible lights and near infrared lights, respectively. The image includes multiple areas and indicates the specific space projected onto a plane. The correction section corrects each area of the image by amplifying intensity of near infrared lights with an increasing amplification factor when a difference between the intensity of near infrared lights and (Continued)

intensity of visible lights and near infrared lights becomes smaller. The image production section produces a new image based on the corrected areas of the image.

4 Claims, 6 Drawing Sheets

(51) Int. Cl.
 *H04N 5/33*   (2006.01)
 *B60R 1/00*   (2006.01)
 *H04N 9/04*   (2006.01)
 *H04N 5/217*  (2011.01)
 *G08G 1/16*   (2006.01)

(52) U.S. Cl.
 CPC ............. *H04N 5/217* (2013.01); *H04N 5/332* (2013.01); *H04N 9/045* (2013.01); *G08G 1/166* (2013.01)

(56) References Cited

FOREIGN PATENT DOCUMENTS

| | | |
|---|---|---|
| JP | 2009-219042 A | 9/2009 |
| JP | 2009-237986 A | 10/2009 |
| JP | 2010-103740 A | 5/2010 |
| JP | 2012-095342 A | 5/2012 |
| JP | 2013-016981 A | 1/2013 |
| WO | 2014/122928 A1 | 8/2014 |

* cited by examiner

US 10,063,788 B2

NIGHT-VISION IMAGE PROCESSING APPARATUS

CROSS REFERENCE TO RELATED APPLICATION

This application is based on Japanese Patent Application No. 2013-023542 filed on Feb. 8, 2013, the disclosure of which is incorporated herein by reference.

TECHNICAL FIELD

The present disclosure relates to an image processing apparatus employed in a vehicular night-vision system.

BACKGROUND ART

A so-called night-vision system mounted in a vehicle has been put into the practice recently (refer to patent literature 1). This type of night-vision system includes a light projector that emits near infrared lights to a specific space defined in the vicinity of the subject vehicle in which the system is mounted, an image taking device that receives lights including the near infrared lights from the specific space and produces an image, and a display device that displays the image produced by the image taking device.

Further, the night-vision system may detect a target object, such as a pedestrian, based on an image produced by the image taking device, and report the presence of the detected object.

It is required for the night-vision system that to upgrade visibility of an image displayed on the display device and to provide an image produced by the image taking device included in the night-vision system in color display.

For meeting the requirements, the image taking device employed in the night-vision system may include multiple light receiving elements that are arranged in the form of a mosaic (matrix), visible light passing filters that transmit visible lights, and near infrared passing filters that transmit near infrared lights.

In recent years, windshields capable of cutting light having wavelengths which fall within an infrared wavelength range have been employed in vehicles for suppressing a temperature rise in a compartment of the vehicle. An adoption of this kind of windshield may decrease an intensity of the near infrared lights, which are reflected from a target object and received by the image taking device. Accordingly, an image produced based on the light received by the image taking device may fail to display the detected object in highlighted manner. In order to display the detected object in highlighted manner, the intensity of near infrared lights may be multiplied by a gain to amplify the intensity of near infrared lights received by each of light receiving elements via each of near infrared passing filters. When the intensity of near infrared lights is amplified, numerous tiny grains or specks that are brighter than the background may appear on the image due to amplification of a noise component of the intensity of near infrared lights received by each of the light receiving elements via each of the near infrared passing filters. When the intensity of near infrared lights is amplified, a flare originally included in the image may be further intensified. The appearance of numerous brighter grains or specks on the image or the intensifying of the flare may decrease a brightness contrast of an image. A decrease in brightness contrast of an image degrades not only a visibility of an image displayed on the display device but also makes a detection of a target object included in the image difficulty for an image processing apparatus included in the night-vision system.

PRIOR ART LITERATURES

Patent Literature

Patent literature 1: JP 2009-219042 A

SUMMARY OF INVENTION

In view of the foregoing difficulties, it is an object of the present disclosure to provide an image processing apparatus that is used in a vehicular night-vision system and produces an image providing improved visibility and improved detection performance for detecting a target object.

According to a first aspect of the present disclosure, an image processing apparatus includes an image acquirement section, a correction section, and an image production section. The image acquirement section acquires an image signal representing an image. The image signal is generated by a light receiving element that receives lights coming from a specific space via a near infrared passing filter and a light receiving element that receives the lights coming from the specific space via a visible light passing filter, the specific space is provided by a spatial area that is preliminarily defined in a vicinity of a vehicle, the near infrared passing filter mainly transmits near infrared lights and the visible light passing filter transmits visible lights and the near infrared lights, the visible lights have respective wavelengths that fall within a visible wavelength range, and the image acquired by the image acquirement section includes multiple areas and indicates the specific space projected onto a plane. The correction section corrects a subject area that is defined as one of the multiple areas included in the image by amplifying an intensity of the near infrared lights in the subject area with an increasing amplification factor when a difference between the intensity of the near infrared lights and an intensity of the lights including the visible lights and the near infrared lights in the subject area becomes smaller. The correction section corrects each of the multiple areas included in the image. The image production section produces a new image based on the multiple areas corrected by the correction section.

With above image processing apparatus, an image that provides improved visibility and improved detection performance for detecting a target object can be produced.

According to a second aspect of the present disclosure, an image processing apparatus includes an image acquirement section, a correction section, and an image production section. The image acquirement section acquires an image signal representing an image. The image signal is generated by a light receiving element that receives lights coming from a specific space via a near infrared passing filter and a light receiving element that receives the lights coming from the specific space via a visible light passing filter, the specific space is provided by a spatial area that is preliminarily defined in a vicinity of a vehicle, the near infrared passing filter mainly transmits near infrared lights and the visible light passing filter transmits visible lights and the near infrared lights, the visible lights have respective wavelengths that fall within a visible wavelength range, and the image acquired by the image acquirement section includes multiple areas and indicates the specific space projected onto a plane. The correction section corrects a subject area that is defined as one of the multiple areas included in the image by amplifying an intensity of the near infrared lights in the subject area with an increasing amplification factor when a ratio of an intensity of the lights including the visible lights and the near infrared lights to the intensity of the near infrared lights in the subject area becomes smaller. The correction section corrects each of the multiple areas included in the image. The image production section produces a new image based on the multiple areas corrected by the correction section.

With above image processing apparatus, advantages similar to the advantages provided by the image processing apparatus according to the first aspect can be provided.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
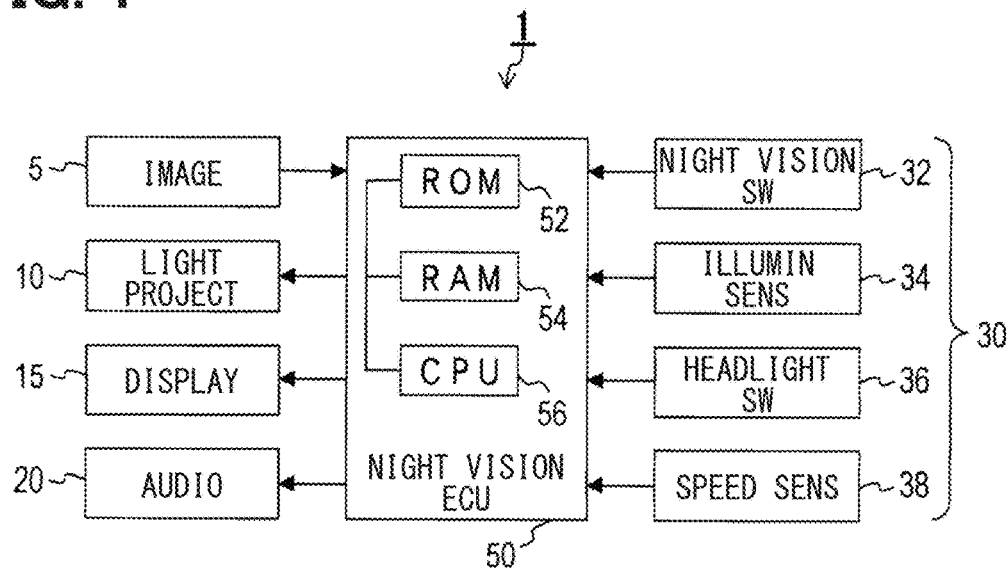
FIG. 1 is a block diagram showing a conceptual configuration of a night-vision system including a night-vision electronic control unit (ECU) to which the present disclosure is applied.

Normally, each of light receiving elements employed in a night-vision system has light receiving sensitivity in a wavelength range from visible light to near infrared light. The light receiving element outputs a signal whose level is associated with the intensity of received lights. Herein the lights may be received via a visible light passing filter or a near infrared passing filter, or the lights may also be received directly with no filter intervened. Herein, the visible light passing filter is an optical filter that allows visible lights and near infrared lights to pass through, and the near infrared passing filter mainly allows near infrared lights to pass through. The visible lights contain specific color information needed to produce a color image. The visible light passing filter is a bandpass filter in which red-green-blue (RGB) filters or cyan-magenta-yellow-green (CyMgYeG) filters are arranged in a Bayer array. The near infrared passing filter (IR filter) is a bandpass filter that transmits lights having wavelengths longer than a wavelength ranging normally from about 600 nm to about 800 nm. Usually, a filter included in an image taking device that produces color images is provided by a RGBIR filter or a CyMgYeIR filter. The RGBIR filter is generated by replacing one of RGBG filters arranged in Bayer array and included in one basic pixel unit with the near infrared passing filter. The CyMgYeIR filter is generated by replacing green filter included in the CyMgYeG filters with the near infrared passing filter. Thus, by adding the near infrared passing filter to the visible light passing filters, a night-vision system that has an excellent color reproduction capability is provided.

The image taking device produces an image that includes multiple pixels. Each pixel has a light intensity which is a sum of an intensity of near infrared light and intensities of visible lights. Herein, the near infrared light and the visible lights are detected by light receiving elements arranged next to each other.

An image produced by the image taking device of the night-vision system is requested to highlight a target object such as a pedestrian against the surroundings of the target object.

In order to produce an image in which a target object is highlighted, the ratio of an intensity of near infrared lights to an intensity of visible lights should be confined within a preliminarily set specified range. Herein, the near infrared lights are reflected from the target object, and the visible lights are emanated from the surroundings of the target object.

In recent years, windshields employed in vehicles cut lights having wavelengths which fall within an infrared wavelength range. The employment of such a windshield decreases an intensity of near infrared lights which are reflected from a target object and received by the image taking device. Thus, an image produced based on the lights received by the image taking device cannot display the target object in highlighted manner.

For solving this problem, as expressed with a formula (1) below, an intensity $L_{IR}$ (hereinafter, near infrared intensity) of near infrared lights received by a light receiving element via a near infrared passing filter is thought to be multiplied by a gain $a_1$ in order to amplify the near infrared intensity. In formula (1), $L_R$ denotes a light intensity detected by a light receiving element via a red filter that allows red lights to pass through, $L_G$ denotes a light intensity detected by a light receiving element via a green filter that allows green lights to pass through, and $L_B$ denotes a light intensity detected by a light receiving element via a blue filter that allows blue lights to pass through.

$$L = L_R + L_G + L_B + a_1 \times L_{IR} \tag{1}$$

By correcting the near infrared intensity based on formula (1), the near infrared intensity $L_{IR}$ is uniformly amplified even for a pixel in which the near infrared intensity $L_{IR}$ is feeble and the visible light intensity is dominant.

Figure 9A:
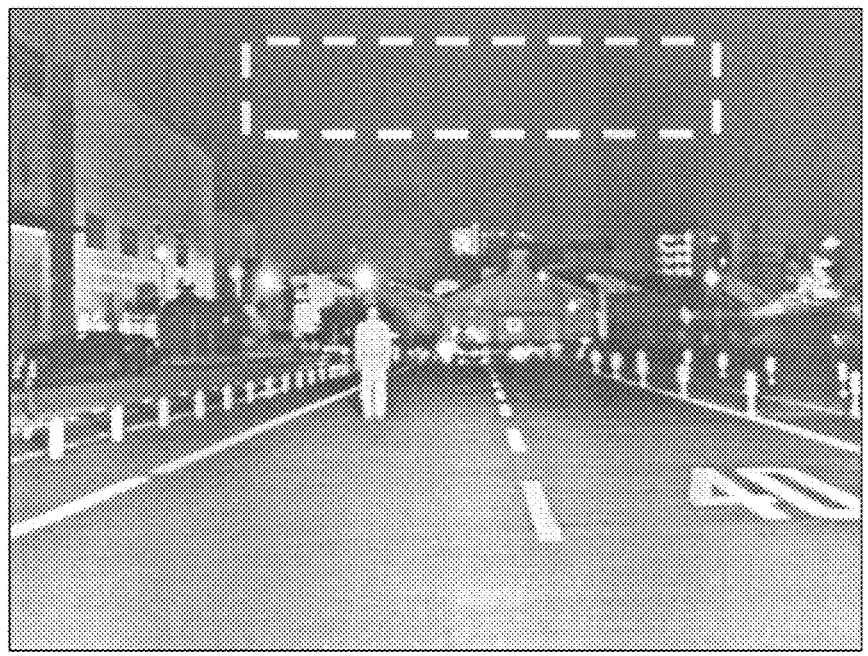
FIG. 9A is an explanatory diagram showing brighter grains or specks appeared in the image that is one of the difficulties a related art is confronted.
Figure 9B:
FIG. 9B is an explanatory diagram showing an intensification of flare that is one of the difficulties a related art is confronted.

An image constructed with pixel values corrected based on formula (1) may include brighter grains or specks appeared on the image like the example shown in FIG. 9A. This may be caused by an amplification of a noise component included in the near infrared intensity $L_{IR}$. As another example, an image constructed with pixel values corrected based on formula (1) may include overly bright flare produced by intensified headlights of an oncoming vehicle like the example shown in FIG. 9B, In these cases, a brightness contrast of the image may be decreased. In FIG. 9A, an area encircled with a dashed line shows an area in which whitish grains or specks appear.

In a case where whitish grains or specks appear in the image or a flare is intensified and the brightness contrast of the image is decreased, not only visibility of an image displayed on a display device is degraded but also a detection performance of the image processing apparatus for detecting a target object may be deteriorated.

As described above, related art has a difficulty in producing an image that provides improved detection performance for detecting a target object together with an improved visibility of an image displayed on the display device.

The following will describe embodiments of the present disclosure with reference to the drawings.

First Embodiment

<Night-Vision System>

A night-vision system 1 shown in FIG. 1 is equipped to a vehicle and reports a situation in a spatial area defined in the vicinity of the vehicle. Hereinafter, the vehicle to which the night-vision system 1 is equipped may is also referred to as subject vehicle.

The night-vision system 1 includes an image taking device (IMAGE) 5, a light projector (LIGHT PROJECT) 10, a display device (DISPLAY) 15, an audio output device (AUDIO) 20, a group of switch sensors 30, and a night-vision electronic control unit (NIGHT VISION ECU) 50. Hereinafter, the night-vision electronic control unit 50 is also referred to as a night-vision ECU.

The light projector 10 is a known device that emits near infrared lights according to a control signal sent from the night-vision ECU 50. The light projector 10 in the present embodiment is disposed to emit near infrared lights to a specific space defined as a spatial area in the vicinity of the subject vehicle.

In the present embodiment, the specific space is defined as a forward space including a forward road and left and right sides of the forward road. Herein, the forward direction is a direction along a travel direction of the vehicle.

The display device 15 is a known display device that displays, according to a signal sent from the night-vision ECU 50, an image (picture) or an indicator, which is intended to attract attention, or the like. The display device 15 may be provided by a liquid crystal display used in a known navigation system, a known head-up display, a monitor incorporated in an instrument panel, or an indication lamp.

The audio output device 20 is a device that converts an electric signal sent from the night-vision ECU 50 into sounds, and outputs the sounds. That is, the audio output device is a so-called loudspeaker.

The group of switch sensors 30 includes a night-vision switch (NIGHT VISION SW) 32, an illuminance sensor (ILLUMIN SENS) 34, a headlight switch (HEADLIGHT SW) 36, and a vehicle speed sensor (SPEED SENS) 38. The switch sensors 30 acquire various pieces of information representing the states of the subject vehicle and the night-vision system 1.

The night-vision switch 32 is a switch that receives an external entry of an activation command for the night-vision system 1. The illuminance sensor 34 is a sensor that detects the illuminance in the vicinity of the subject vehicle. The headlight switch 36 is a known switch for turning on or turning off the headlights of the subject vehicle. The vehicle speed sensor 38 is a known sensor that detects the speed of the subject vehicle.

The image taking device 5 is a known image taking device that includes an image sensor, optical lens, optical filter, and peripheral electronic circuit of a power supply or the like. The image taking device uses the image sensor to produce an image.

The image sensor in the present embodiment is a known image sensor having multiple light receiving elements arrayed in the form of a mosaic (matrix). For example, the image sensor may be provided by a known charge coupled device (CCD) image sensor or a complementary metal oxide semiconductor (CMOS) image sensor.

Figure 2:
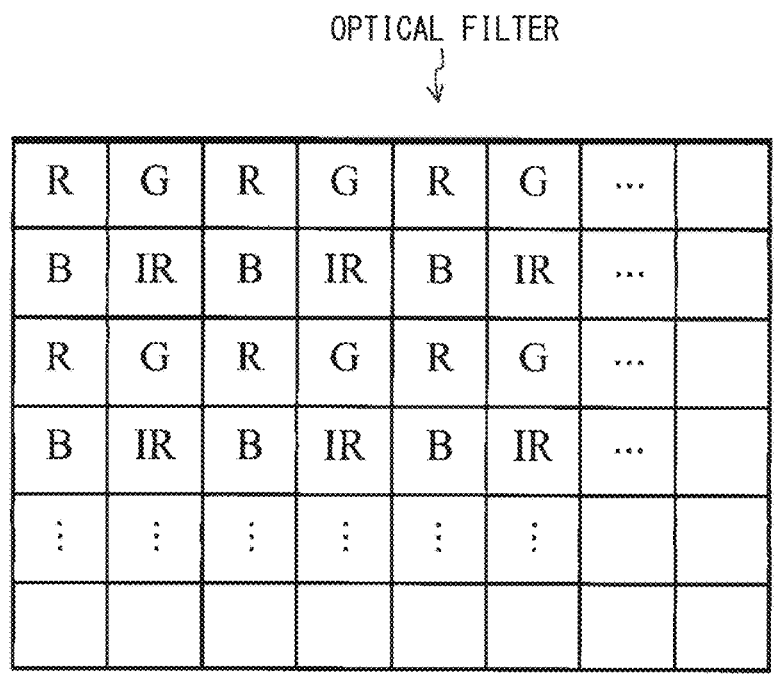
FIG. 2 is an explanatory diagram showing a structure of an optical filter.

The optical filter in the present embodiment includes, as shown in FIG. 2, near infrared passing filters (IR) and visible light passing filters (R, G, and B). The visible light passing filters (R, G, and B) are filters that transmit light having wavelengths which fall within a visible wavelength range. The visible light passing filters include red filters (R), green filters (G), and blue filters (B).

Specifically, the optical filter is a filter including the near infrared passing filters (IR), red filters (R), green filters (G), and blue filters (B) arrayed in the form of a matrix. The near infrared passing filters (IR), red filters (R), green filters (G), and blue filters (B) are disposed to cover the respective light receiving surfaces of the light receiving elements included in the image sensor.

Figure 3:
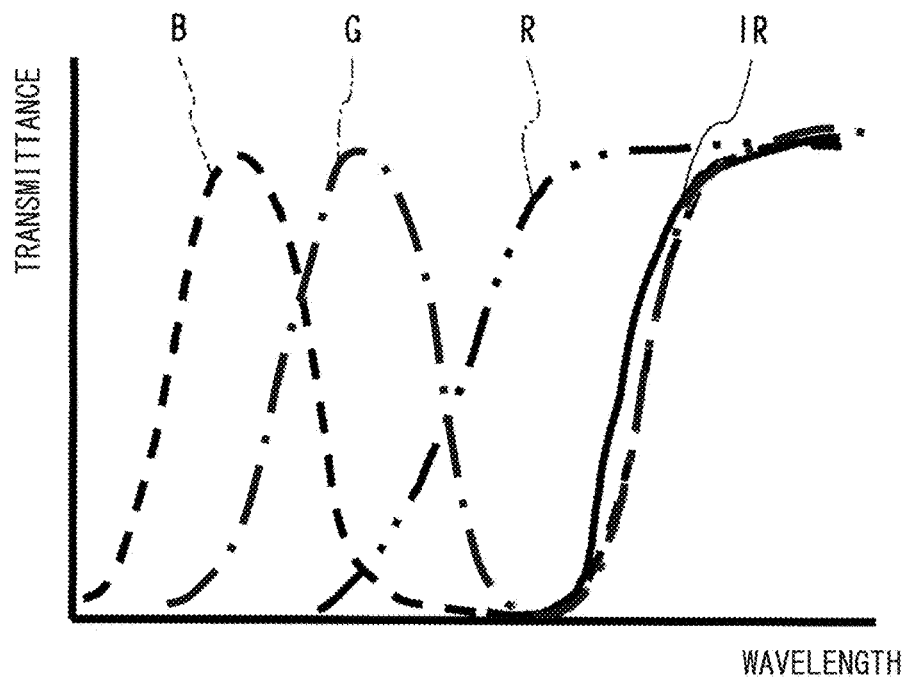
FIG. 3 is an explanatory diagram showing a transmission characteristic of the optical filter.

The red filters (R) are known filters that transmit, as shown in FIG. 3, lights having wavelengths of red, which is one of three primary colors of light, and lights (that is, near infrared lights) having wavelengths which fall within a near infrared wavelength range. The green filters (G) are known filters that transmit, as shown in FIG. 3, lights having wavelengths of green, which is one of three primary colors of light, and lights having wavelengths which fall within the near infrared wavelength range. The blue filters (B) are known filters that transmit, as shown in FIG. 3, lights having wavelengths of blue, which is one of three primary colors of light, and lights having the wavelengths which fall within the near infrared wavelength range.

The near infrared passing filters (IR) are filters that mainly transmit, as shown in FIG. 3, near infrared lights.

Specifically, in the image taking device 5 according to the present embodiment, the sum of an intensity of near infrared lights and intensities of three kinds of visible lights is regarded as light intensity of one pixel. Herein, the infrared lights and three kinds of visible lights are detected by four adjoining light receiving elements. Then, an image is generated by multiple pixels. Therefore, an image produced by the image taking device 5 indicates the specific space projected onto a plane including multiple pixels. Multiple pixels constituting the image produced by the image taking device 5 are also referred to as multiple areas constituting the image.

<Night-Vision ECU>

The night-vision ECU 50 is provided by a known computer, and includes, at least, a ROM 52, a RAM 54, and a CPU 56. The ROM 52 stores processing programs and data items whose stored contents have to be maintained even if a power supply is disconnected. The RAM 54 stores the processing programs and data items for temporarily. The CPU 56 performs various pieces of processes according to the processing programs stored in the ROM 52 or RAM 54.

The ROM 52 of the night-vision ECU 50, at least, stores a processing program. The CPU 56 performs night-vision process according to the processing program stored in the ROM 52. The night-vision process is a process for carrying out a night-vision display. In night-vision display, near infrared lights are emitted from the light projector 10 to the specific space, and an images produced based on an image taken by the image taking device is displayed on the display device 15. That is, in the embodiment of the present disclosure, the night-vision ECU 50 functions as an image processing apparatus.

<Night-Vision Process>

Night-vision process is activated in response to a turning on of an ignition switch or turning on of the night-vision switch, and is repeatedly performed. Herein, the turning on of the ignition switch or the turning on of the night-vision switch may be set as a flag that is referred for activating the night-vision process.

Figure 4:
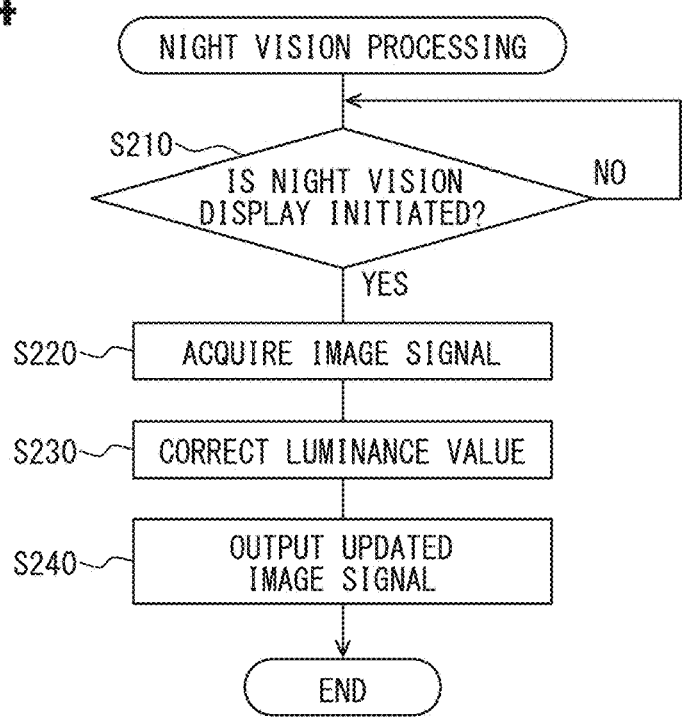
FIG. 4 is a flowchart showing a night-vision process according to a first embodiment.

When night-vision process is activated, first, the CPU 56 of night-vision ECU 50 determines whether a condition for initiation of the night-vision display is satisfied (S210) as shown in FIG. 4. Herein, night-vision display indicates a display manner in which near infrared lights are emitted from the light projector 10 to the specific space and an image produced based on an image taken by the image taking device 5 is displayed on the display device 15.

The condition for initiation of the night-vision display in the present embodiment is set as a receiving of an activation command made to the night-vision switch 32. In the condition for initiation of night-vision display, a condition for acquiring the image produced by the image taking device 5 may be set as an illuminance detected by the illuminance sensor 34 is equal to or lower than a specific illuminance that is preliminarily defined as a nighttime illuminance, or the condition for acquiring the image produced by the image taking device 5 may be set as a turning on of the headlight switch 36, or the condition for acquiring the image produced by the image taking device 5 may be set as both the illuminance is equal to or lower than the specific illuminance and the turning on of the headlight switch 36. Further, in the condition for initiation of night-vision display, a condition for allowing the light projector 10 to emit near infrared lights may be set as a vehicle speed detected by the vehicle speed sensor 38 is equal to or higher than a predetermined specific vehicle speed.

When the condition for initiation of night-vision display is not satisfied (S210: NO), a standby state continues until the condition for initiation of night-vision display is satisfied. When the condition for initiation of night-vision display is satisfied (S210: YES), the process proceeds to S220. In the present embodiment, the night-vision display is in a deactivated state, an image (picture) can be displayed on the display device 15 under a state in which the light projector does not emit light.

At S220, the CPU 56 of night-vision ECU 50 acquires an image signal representing an image produced by the image taking device 5, that is, the night-vision ECU 50 acquires the image produced by the image taking device 5. Thereafter, light intensities of pixels constituting the image acquired at S220 are corrected into new light intensities L according to the following formula (2) (S230).

$$L = a_2/(L_R - L_{IR} + 1) \times L_{IR} + L_R + L_G + L_B \quad (2)$$

In formula (2), $L_{IR}$, $L_R$, $L_G$, and $L_B$ denote light intensities detected by four light receiving elements and respective components of a light intensity of one pixel. In formula (2), $L_{IR}$ denotes an intensity (hereinafter, referred to as a near infrared intensity) of lights received by a light receiving element via a near infrared passing filter (IR), $L_R$ denotes an intensity (hereinafter, referred to as a red light intensity) of lights received by a light receiving element via a red filter (R), $L_G$ denotes an intensity (hereinafter, referred to as a green light intensity) of lights received by a light receiving element via a green filter (G), and $L_B$ denotes an intensity (hereinafter, referred to as a blue light intensity) of lights received by a light receiving element via a blue filter (B).

For example, the following will describe a calculation of a light intensity L of a left uppermost pixel with reference to FIG. 2. In this case, a light intensity detected by the left uppermost light receiving element is the red light intensity $L_R$, a light intensity detected by an adjoining light receiving element under the left uppermost one is the blue light intensity $L_B$, a light intensity detected by an adjoining light receiving element on the right side of the left uppermost one is the green light intensity $L_G$, and a light intensity detected by a light receiving element on the right side of the one under the left uppermost one is the near infrared intensity $L_{IR}$.

In the present disclosure, light receiving elements that receive lights from the specific space via respective red filters, which mainly transmit lights having wavelengths of red lights and near infrared lights, may be referred to as first light receiving elements. The light receiving elements that receive lights from the specific space via respective green filters, which mainly transmit lights having wavelengths of green lights and near infrared lights, may be referred to as second light receiving elements. The light receiving elements that receive lights from the specific space via respective blue filters, which mainly transmit lights having wavelengths of blue lights and near infrared lights, may be referred to as third light receiving elements.

In formula (2), $a_2$ denotes a predetermined amplification factor.

Figure 5:
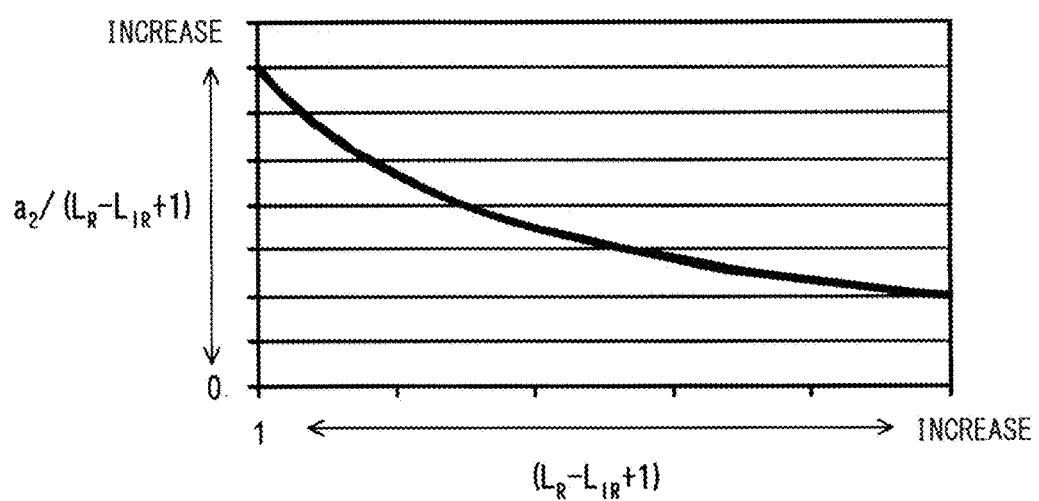
FIG. 5 is an explanatory diagram showing a gain according to the first embodiment.

Suppose that one of pixels constituting an image is set as a subject pixel. In formula (2), a gain by which the near infrared intensity $L_{IR}$ of the subject pixel is multiplied increases when the near infrared intensity $L_{IR}$ in the subject pixel becomes more dominant over the intensity of visible lights as shown in FIG. 5. In the present embodiment, the expression of the near infrared intensity is dominant means that the difference of the near infrared intensity $L_{IR}$ from the intensity of lights including the visible lights and near infrared lights in the subject pixel is smaller than a predetermined level. When the difference of the near infrared intensity $L_{IR}$ from the intensity of lights including the visible lights and near infrared lights in the subject pixel becomes smaller, the value of the gain by which the near infrared intensity $L_{IR}$ in the subject pixel is multiplied becomes greater.

In the present embodiment, when the value ($=L_R-L_{IR}+1$) obtained by adding 1 to the difference between the red light intensity $L_R$ and near infrared intensity $L_{IR}$ becomes smaller, the near infrared intensity $L_{IR}$ in the subject pixel becomes more dominant over the intensity of visible lights. As described above, the red filter has a property of transmitting near infrared lights, which have wavelengths falling within a near infrared wavelength range, in addition to lights having wavelengths of red lights. Thus, when near infrared lights included in the lights coming from the space associated with the subject pixel is more intense, the red light intensity $L_R$ becomes approximately equal to the near infrared intensity $L_{IR}$.

Specifically, at S230 in the present embodiment, correction control is implemented in order to correct the intensity of subject pixel so that the near infrared intensity $L_{IR}$ in the subject pixel can be amplified more greatly when the near infrared intensity $L_{IR}$ in the subject pixel is more dominant over the light intensity of visible lights. In this correction control, when the near infrared intensity $L_{IR}$ in the subject pixel is not dominant over the intensity of visible lights, the near infrared intensity $L_{IR}$ in the subject pixel is corrected with a smaller correction amount based on the near infrared intensity $L_{IR}$ in the image acquired at S220.

Above-described correction control is performed for each of pixels included in the image.

The CPU 56 of night-vision ECU 50 outputs an image signal (hereinafter, referred to as an updated image signal) including the corrected light intensities L, to the display device 15 (S240). At S240, the display device 15 displays an image. In the image, when the original near infrared intensity $L_{IR}$ in one pixel is dominant over the intensity of visible lights, the near infrared intensity $L_{IR}$ has been amplified.

At S240 of the night-vision process, a target object, such as a pedestrian or light vehicle, is detected based on the image having the corrected light intensities L acquired at S230, and the presence of the target object is reported to the driver. Herein, the light vehicle is a vehicle without a prime mover. Since the processing for detecting the target object is a known art, a specific description will be omitted. For example, a feature model that is prepared in advance as a model representing the features of a target object may be collated with an area of the image having a relatively high near infrared intensity. When a consistence level of the prepared feature model and the target area is equal to or higher than a specific threshold, the area is determined as the target object. In this case, the feature models may include multiple models representing respective features of parts of a human being or may be a template representing the features of the whole of a human being.

When reporting the presence of the target object, the night-vision ECU 50 may display, in overlapped manner, a mark indicating the detected target object on the image displayed on the display device 15, which is generated based on the updated image signal. For another example, the presence of the target object may be reported to the driver by outputting a message or a sound indicating presence of the target object via the audio output device 20. For another example, the presence of the target object may be reported to the driver using both the display device 15 and the audio output device.

Thereafter, night-vision process is terminated.

In the present embodiment, process executed by the CPU 56 at S220 functions as an image acquirement section, process executed by the CPU 56 at S230 functions as a correction section, and process executed by the CPU 56 at S240 functions as an image production section.

It is noted that a flowchart or the processing of the flowchart in the present disclosure includes sections (also referred to as steps), each of which is represented, for instance, as S210. Further, each section can be divided into several sub-sections while several sections can be combined into a single section. Furthermore, each of thus configured sections can be also referred to as a circuit, device, module, or means.

Advantages Provided by the First Embodiment

As described above, the night-vision system 1 displays an image including multiple pixels each of which expresses intensities of visible lights and intensity of near infrared lights. That is, the night-vision system 1 can display a color image on the display device 15. Therefore, the night-vision system 1 improves a visibility of the image displayed on the display device 15.

According to night-vision process in the present embodiment, only pixels in each of which the intensity of near infrared lights is dominant over the intensity of visible lights are corrected so that the near infrared intensity $L_{IR}$ can be amplified.

Accordingly, when an image is corrected by the night-vision ECU 50 so that the near infrared intensities $L_{IR}$ are amplified, a target object such as a pedestrian or a light vehicle is highlighted against the surroundings of the target object. Specifically, for the purpose of suppressing a temperature rise in a vehicle compartment, the windshield of the vehicle is processed to block lights having wavelengths, which fall within an infrared wavelength range. The image taking device 5 performs the night vision display by capturing near infrared lights and visible lights transmitting through the windshield of the vehicle. As described above, the near infrared lights are restricted to transmit through the windshield. Thus, when processing the image, a gain for the near infrared intensity is increased for the pixel which includes a larger amount of near infrared lights than an amount of visible lights. For other pixels, the gain for the near infrared intensity is maintained without being increased. This image processing enables a display of the image in which the target object such as a pedestrian or light vehicle is highlighted against the surroundings of the target object.

In above-described night-vision process, a target object is detected based on an image displayed based on corrected light intensities. Thus, an area including an object that reflects near infrared lights can be readily detected. Thus, the performance for detecting the target object can be improved.

Figure 6A:
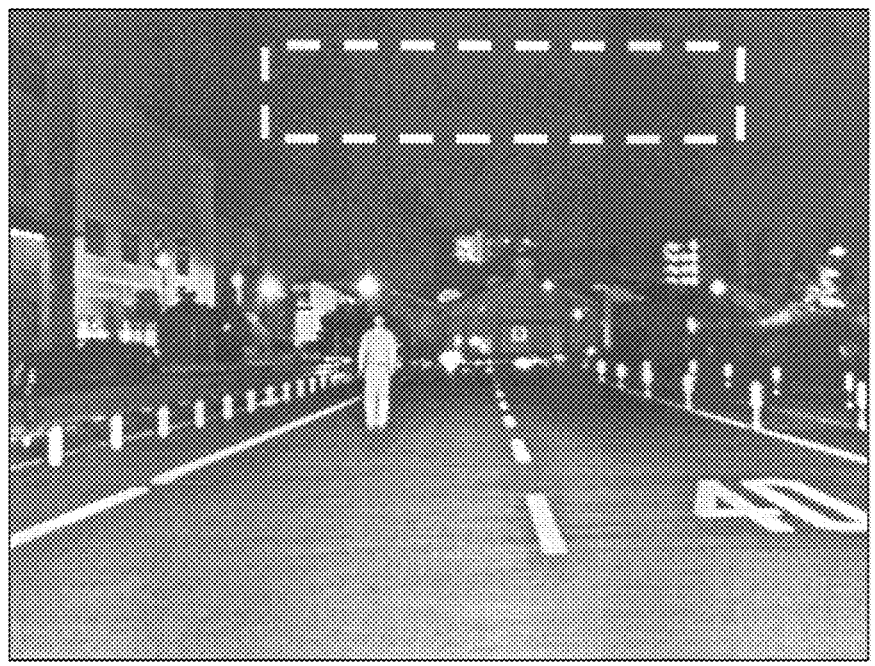
FIG. 6A is an explanatory diagram showing a suppression of brighter grains or specks appeared in the image as noise which is one of the advantageous effects of the embodiment.

When an image is corrected by the night-vision ECU 50 so that the near infrared intensities $L_{IR}$ are amplified, appearance of whitish grains or specks in the image can be suppressed as shown in FIG. 6A. In FIG. 6A, an area encircled with a dashed line corresponds to an area in which brighter grains or specks appeared in the image according to a related art.

Figure 6B:
FIG. 6B is an explanatory diagram showing a suppression of flare intensification which is one of the advantageous effects of the embodiment.

When an image is corrected by the night-vision ECU 50 so that the near infrared intensities $L_{IR}$ are amplified, intensifying of the flare produced by the headlights of an oncoming vehicle as a light source can be suppressed as shown in FIG. 6B. Therefore, according to night-vision process of the present embodiment, a decrease in brightness contrast can be suppressed.

The night-vision system 1 according to the present embodiment can produce an image which provides improved detection performance for detecting a target object and provide visibility.

Second Embodiment

The following will describe a second embodiment of the present disclosure. A night-vision system according to the present embodiment is different from the night-vision system 1 according to the first embodiment mainly in night-vision process to be performed by the night-vision ECU 50.

In the present embodiment, the same reference signs will be assigned to components and pieces of processing identical or equivalent to those of the first embodiment, and a repeated description will be omitted. The following will mainly describe the night-vision process different from that of the first embodiment.

<Night-Vision Process>

Night-vision process in the present embodiment is activated in response to a turning on of an ignition switch or turning on of the night-vision switch, and is repeatedly performed. Herein, the turning on of the ignition switch or the turning on of the night-vision switch may be set as a flag that is referred for activating the night-vision process.

Figure 7:
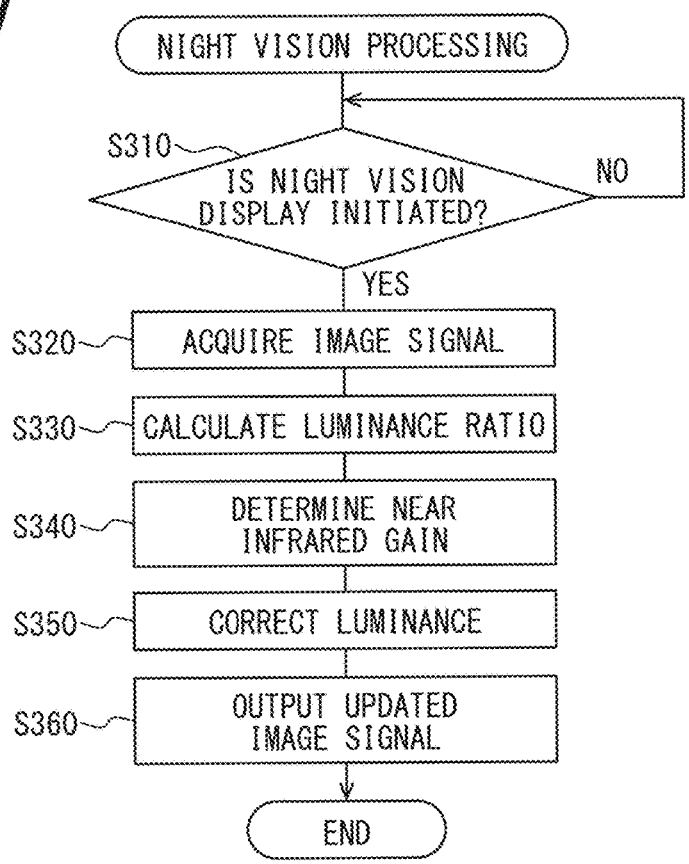
FIG. 7 is a flowchart describing a night-vision process according to a second embodiment.

When the night-vision process is activated, first, the night-vision ECU 50 determines whether a condition for initiation of night-vision display is satisfied as shown in FIG. 7 (S310). The condition for initiation of night-vision display in the present embodiment may be set similar to the condition for initiation of night-vision display in the first embodiment. A repeated description will be omitted.

When the condition for initiation of night-vision display is not satisfied (S310: NO), a standby state continues until the condition for initiation of night-vision display is satisfied. When the condition for initiation of night-vision display is satisfied (S310: YES), the process proceeds to S320.

At S320, an image signal representing an image produced by the image taking device 5, that is, the image produced by the image taking device 5 is acquired. Thereafter, a ratio (=$L_R/L_{IR}$, and hereinafter, referred to as an intensity ratio) of a red light intensity $L_R$ in one (that is, a subject pixel) of pixels, which constitute the image acquired at S320, to a near infrared intensity $L_{IR}$ is calculated (S330).

The night-vision ECU 50 refers to a lookup table (LUT) prepared in advance for specifying a gain $a_3$ corresponding to the intensity ratio RR calculated at S330, Herein, the gain $a_3$ (hereinafter, referred to as a near infrared gain) is an amplification factor by which the near infrared intensity $L_{IR}$ in the subject pixel to be multiplied (S340).

Figure 8:
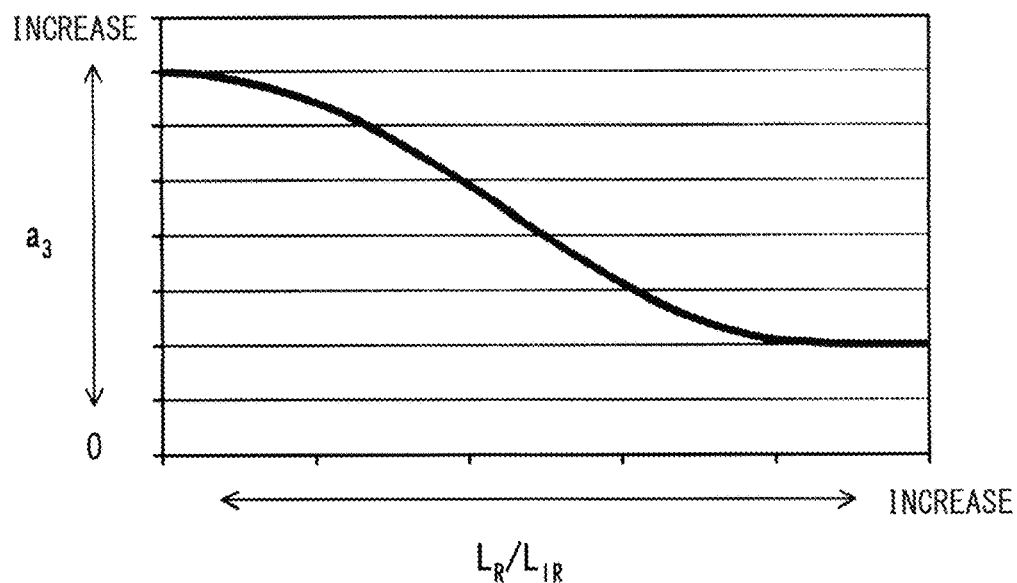
FIG. 8 is an explanatory diagram showing a gain according to the second embodiment.

The lookup table in the present embodiment indicates a correspondence relationship between intensity ratio RR and near infrared gains $a_3$, and is obtained in advance through experiments or the like. As shown in FIG. 8, in the lookup table, the near infrared gain $a_3$ increases when the near infrared intensity $L_{IR}$ in each pixel becomes more dominant over the intensity of visible lights. In the present embodiment, the expression that the near infrared intensity is dominant means that the ratio of the intensity of lights, which include visible lights and near infrared lights in subject pixel, to the near infrared intensity $L_{IR}$ is smaller than a predetermined level. When the ratio of the intensity of lights, which include visible lights and near infrared lights, to the near infrared intensity $L_{IR}$ becomes smaller, the value of the gain by which the near infrared intensity $L_{IR}$ in the subject pixel to be multiplied becomes larger.

In the present embodiment, when the intensity ratio RR of the red light intensity $L_R$ to the near infrared intensity $L_{IR}$ becomes smaller, the near infrared intensity $L_{IR}$ in the subject pixel becomes more dominant over the intensity of visible lights. As described above, the red filter has a property of transmitting near infrared lights, which have wavelengths falling within a near infrared wavelength range, in addition to lights having wavelengths of red lights. Thus, when near infrared lights included in the lights coming from the space associated with the subject pixel is more dominant, the red light intensity $L_R$ becomes approximately equal to the near infrared intensity $L_{IR}$.

Specifically, the near infrared gain $a_3$ determined at S340 in the present embodiment becomes to a larger amplification factor when the near infrared intensity $L_{IR}$ in the subject pixel is more dominant over the intensity of visible lights.

In night-vision process, the light intensity L in the subject pixel is calculated based on the near infrared gain $a_3$, which is determined at S340, according to the following formula (3) (S350).

$$L = a_3 \times L_{IR} + L_R + L_G + L_B \quad (3)$$

In formula (3), $L_R$ denotes red light intensity in the subject pixel, $L_G$ denotes a green light intensity in the subject pixel, and $L_B$ denotes a blue light intensity in the subject pixel.

In the present embodiment, steps from S330 to S350 are executed for each of the pixels included in an image.

The night-vision ECU 50 outputs an image signal (that is, an updated image signal) having the corrected light intensities L to the display device 15 (S360). At S360, the display device 15 displays an image. In the image, for each of pixels in which the near infrared intensity is dominant over the intensity of visible light, the near infrared intensity $L_{IR}$ is amplified by the night-vision ECU 50.

At S360 of night-vision process, the night-vision ECU 50 detects a target object such as a pedestrian or light vehicle in an image having the light intensities L corrected at S350. When the target object is detected, the presence of the target object is reported to the driver. Since the detection of the target object is known art, a specific description will be omitted. For example, a feature model that is prepared in advance as a model representing the features of a target object may be collated with each of areas in an image in which a near infrared intensity is high. As a result, an area whose degree of consistence is equal to or larger than a specific threshold is detected as the target object. In this case, the feature model may include multiple models representing the respective features of parts of a human being or may be a template representing the features of the whole of the human being.

When reporting the presence of the target object, the night-vision ECU 50 may display, in overlapped manner, a mark indicating the detected target object on the image displayed on the display device 15, which is generated based on the updated image signal. For another example, the presence of the target object may be reported to the driver by outputting a message or a sound indicating presence of the target object via the audio output device 20. For another example, the presence of the target object may be reported to the driver using both the display device 15 and the audio output device.

Thereafter, night-vision process is terminated.

In the present embodiment, process executed by the CPU 56 at S320 functions as an image acquirement section, processes executed by the CPU 56 at S330, S340, S350 function as a correction section, and process executed by the CPU 56 at S360 functions as an image production section.

Advantages Provided by the Second Embodiment

According to above-described night-vision process, the same advantageous effects as those of the night-vision process of the first embodiment can be provided.

Further, according to the night-vision process of the present embodiment, since the near infrared gain $a_3$ is determined by referring to a lookup table, a calculation processing load for obtaining the light intensity L of the subject pixel can be reduced. As a result, according to the night-vision process of the present embodiment, a processing load required for displaying an image based on an updated image signal can be reduced.

Other Embodiments

The embodiments of the present disclosure have been described so far. The present disclosure is not limited to the embodiments, but can be implemented in various forms without a departure from the gist of the present disclosure.

In the first embodiment, whether the near infrared intensity $L_{IR}$ in the subject pixel is dominant over the intensity of visible light is determined based on an outcome ($=L_R-L_{IR}+1$) obtained by adding 1 to the difference between the red light intensity $L_R$ and near infrared intensity $L_{IR}$. The contents of an arithmetic employed in the above determination are not limited to the calculation of $L_R-L_{IR}+1$. Specifically, the contents of the arithmetic employed in the decision may be modified by substituting the blue light intensity $L_B$ for the red light intensity $L_R$ ($=L_B-L_{IR}+1$), or substituting the green light intensity $L_G$ for the red light intensity $L_R$ ($=L_G-L_{IR}+1$). The light receiving element, which receives lights coming from a specific space via a visible light passing filter, may be any of the first light receiving element that receives the lights coming from the specific space via the red filter, the second light receiving element that receives the lights coming from the specific space via the green filter, and the third light receiving element that receives the lights coming from the specific space via the blue filter.

The blue filter has a property of transmitting lights, which have wavelengths falling within a near infrared wavelength range, in addition to lights having wavelengths of blue. Thus, when the near infrared lights are dominant in lights coming from the space associated with the subject pixel, the blue light intensity $L_B$ has a value approximately equal to the near infrared intensity $L_{IR}$.

The green filter has a property of transmitting light, which have wavelengths falling within a near infrared wavelength range, in addition to lights having wavelengths of green. Thus, when the near infrared lights are dominant in lights coming from the space associated with the subject pixel, the green light intensity $L_G$ has a value approximately equal to the order of the near infrared intensity $L_{IR}$.

Further, the arithmetic employed in the determination may be replaced with an arithmetic ($=(L_R+L_G+L_B)-L_{IR}+1$) of adding 1 to the difference between the total sum of intensities of visible lights ($=L_R+L_G+L_B$) and the near infrared intensity $L_{IR}$.

In the second embodiment, whether the near infrared intensity $L_{IR}$ in the subject pixel is dominant over the intensity of visible light is determined based on the ratio (that is, the intensity ratio RR) of the red light intensity $L_R$ to the near infrared intensity $L_{IR}$. The contents of an arithmetic employed in the decision are not limited to the calculation of the ratio of the red light intensity $L_R$ to the near infrared intensity $L_{IR}$. Specifically, the ratio of the blue light intensity $L_B$ to the near infrared intensity $L_{IR}$, the ratio of the green light intensity $L_G$ to the near infrared intensity $L_{IR}$, or the ratio of the total sum of the intensities of visible lights ($=L_R+L_B+L_G$) to the near infrared intensity $L_{IR}$ may be adopted as the intensity ratio RR.

The image taking device 5 in the foregoing embodiments includes the RGBIR filter as an optical filter. The optical filter included in the image taking device 5 is not limited to the RGBIR filter. For example, a CyMgYeIR filter will be used as the optical filter in the image taking device 5. The optical filter in the present disclosure may be provided by any filter as long as the filter is formed by adding a near infrared passing filter to visible light passing filters.

Suppose that the optical filter in the image taking device 5 is provided by the CyMgYeIR filter. In this case, an object of comparison employed in determination whether the near infrared intensity $L_{IR}$ in the subject pixel is dominant may be provided by a light intensity based on a signal sent from a light receiving element that receives lights transmitted through at least one of the cyan, magenta, or yellow filters. Further, the comparison object may also be provided by at least one of the red light intensity $L_R$, blue light intensity $L_B$, or green light intensity $L_G$ calculated based on the lights transmitted through the cyan, magenta, and yellow filters respectively. The comparison object may also be provided by total sum of the red light intensity $L_R$, blue light intensity $L_B$, and green light intensity $L_G$ calculated based on the lights transmitted through the cyan, magenta, and yellow filters respectively.

An image produced by the image taking device 5 in the foregoing embodiments is a static image. However, the image produced by the image taking device 5 is not limited to the static image. For example, the image may also be a dynamic image. That is, the image taking device 5 may be a camera that produces a moving image.

In the foregoing embodiments, correction control is implemented for each of multiple pixels. The correction control need not be implemented for each pixel. For example, pixels constituting an image may be divided into multiple groups, and correction control may be implemented for each of the groups. In this configuration, a screen on which an image including multiple pixels is displayed is divided into multiple areas corresponding to multiple groups of pixels. When an area includes larger amount of near infrared lights than an amount of visible lights, a gain for the intensity of the near infrared light is increased. For other areas, the gain for the intensity of the near infrared lights may be maintained without being increased. This configuration can avoid a possibility that brighter grains or specks appear on the image or a possibility that intensified flare appear on the image.

In the foregoing embodiments, the night-vision ECU 50 is disposed separately from the image taking device 5. Alternatively, the night-vision ECU 50 may be included in the image taking device 5.

The image processing apparatus (night-vision ECU 50) of the present disclosure includes the image acquirement section 50, S220, the correction section 50, S230, and the image production section 50, S240. The image acquirement section 50, S220 acquires an image signal representing an image. The image signal is generated by a light receiving element that receives lights coming from a specific space via a near infrared passing filter and a light receiving element that receives the lights coming from the specific space via a visible light passing filter, the specific space is provided by a spatial area that is preliminarily defined in a vicinity of a vehicle, the near infrared passing filter mainly transmits near infrared lights and the visible light passing filter transmits visible lights and the near infrared lights, the visible lights have respective wavelengths that fall within a visible wavelength range, and the image acquired by the image acquirement section 50, S220 includes multiple areas and indicates the specific space projected onto a plane. The correction section 50, S230 corrects a subject area that is defined as one of the multiple areas included in the image by amplifying an intensity of the near infrared lights in the subject area with an increasing amplification factor when a difference between the intensity of the near infrared lights and an intensity of the lights including the visible lights and the near infrared lights in the subject area becomes smaller. The correction section 50, S230 corrects each of the multiple areas included in the image. The image production section 50, S240 produces a new image based on the multiple areas corrected by the correction section 50, S230.

Further, the correction section 50, S330 to S350 may correct a subject area that is defined as one of the multiple areas included in the image by amplifying an intensity of the near infrared lights in the subject area with an increasing amplification factor when a ratio of an intensity of the lights including the visible lights and the near infrared lights to the intensity of the near infrared lights in the subject area becomes smaller.

According to the foregoing image processing apparatus, an image including multiple pixels each of which having intensities of different types of visible lights and an intensity of near infrared lights can be acquired. That is, the image processing apparatus can acquire a color image. Further, in the present disclosure, a processed image produced based on the acquired color image includes multiple pixels each of which has the intensities of visible lights and the intensity of near infrared lights.

Therefore, the image processing apparatus of the present disclosure can newly construct an image to be displayed on the display device, and the image provides an improved visibility.

Further, according to the image processing apparatus of the present disclosure, only pixels in each of which the intensity of near infrared lights is dominant over the intensity of visible lights are corrected so that the intensity of near infrared lights is amplified.

Therefore, the image processing apparatus of the present disclosure can suppress appearance of brighter grains or specks on the image or intensification of flare produced by the headlights of an oncoming vehicle as a light source in a newly processed image. That is, the image processing apparatus according to the present disclosure can produce an image in which a decrease in brightness contrast is suppressed.

As a result, when a target object is detected based on an image newly produced by the image processing apparatus of the present disclosure, performance in detecting the target object can be improved.

That is, the image processing apparatus of the present disclosure can produce an image which provides an improved performance in detecting a target object together with an improved visibility.

The present disclosure is not limited to the aforesaid embodiments. A form obtained by excluding part of the components of any of the embodiments to such an extent that the problems of the present disclosure can be solved is regarded as an embodiment of the present disclosure. A form constructed by appropriately combining any of the embodiments and a variant is regarded as an embodiment of the present disclosure. Various forms conceivable without a departure from the nature of the present disclosure specified with the words in claims are regarded as embodiments of the present disclosure. The reference signs employed in a description of the embodiments are employed in claims. The employment is intended to help facilitate understanding of the present disclosure relevant to the claims but is not intended to limit the technological scope of the present disclosure relevant to the claims.

The invention claimed is:

1. An image processing apparatus comprising:
an image acquirement section acquiring, using a processor, an image signal representing an image, wherein the image signal is generated by a light receiving element that receives lights coming from a specific space via a near infrared passing filter and a light receiving element that receives the lights coming from the specific space via a visible light passing filter, the specific space is provided by a spatial area that is preliminarily defined in a vicinity of a vehicle, the near infrared passing filter mainly transmits near infrared lights and the visible light passing filter transmits visible lights and the near infrared lights, the visible lights have respective wavelengths that fall within a visible wavelength range, and the image acquired by the image acquirement section includes a plurality of areas and indicates the specific space projected onto a plane;

a correction section correcting, using the processor, a subject area that is defined as one of the plurality of areas included in the image by amplifying an intensity of the near infrared lights in the subject area with an increasing amplification factor when determining that a difference between the intensity of the near infrared lights and an intensity of the lights including the visible lights and the near infrared lights in the subject area becomes smaller, wherein the correction section corrects each of the plurality of areas included in the image;

an image production section producing, using the processor, a new image based on the plurality of areas corrected by the correction section; and wherein when correcting the intensity of the near infrared lights in the subject area, the correction section multiplies the intensity of the near infrared lights by the amplification factor, and the amplification factor is a coefficient that increases with a decrease of the difference between the intensity of the near infrared lights and the intensity of the lights including the visible lights and the near infrared lights.

2. The image processing apparatus according to claim 1, wherein
the light receiving element that receives the lights coming from the specific space via the visible light passing filter is provided by one of a first light receiving element, a second light receiving element, or a third light receiving element,
the first light receiving element receives the lights coming from the specific space via a red filter that mainly transmits the near infrared lights and the lights having wavelengths of red lights,
the second light receiving element receives the lights coming from the specific space via a green filter that mainly transmits the near infrared lights and the lights having wavelengths of green lights,
the third light receiving element receives the lights coming from the specific space via a blue filter that mainly transmits the near infrared lights and the lights having wavelengths of blue lights, and each of the red light, the green light, and the blue light is one of three primary colors of light, and
the intensity of the lights including the visible lights and the near infrared lights includes the intensity of the near infrared lights and an intensity of the visible lights, which are at least one of red lights, green lights, or blue lights, and the red light, the green light, and the blue light configure the three primary colors of light.

3. An image processing apparatus comprising:
an image acquirement section acquiring, using the processor, an image signal representing an image, wherein the image signal is generated by a light receiving element that receives lights coming from a specific space via a near infrared passing filter and a light receiving element that receives the lights coming from the specific space via a visible light passing filter, the specific space is provided by a spatial area that is preliminarily defined in a vicinity of a vehicle, the near infrared passing filter mainly transmits near infrared lights and the visible light passing filter transmits visible lights and the near infrared lights, the visible lights have respective wavelengths that fall within a visible wavelength range, and the image acquired by the image acquisition section includes a plurality of areas and indicates the specific space projected onto a plane;

a correction section correcting, using the processor, a subject area that is defined as one of the plurality of areas included in the image by amplifying an intensity of the near infrared lights in the subject area with an increasing amplification factor when determining that a ratio of an intensity of the lights including the visible lights and the near infrared lights to the intensity of the near infrared lights in the subject area becomes smaller, wherein the correction section corrects each of the plurality of areas included in the image;

an image production section producing, using the processor, a new image based on the plurality of areas corrected by the correction section; and wherein, when correcting the intensity of the near infrared lights in the subject area, the correction section multiplies the intensity of the near infrared lights by the amplification factor, and the amplification factor is a coefficient that increases with a decrease of the ratio of the intensity of the lights including the visible lights and the near infrared lights to the intensity of the near infrared lights.

4. The image processing apparatus according to claim 3, wherein the light receiving element that receives the lights coming from the specific space via the visible light passing filter is provided by one of a first light receiving element, a second light receiving element, or a third light receiving element, the first light receiving element receives the lights coming from the specific space via a red filter that mainly transmits the near infrared lights and the lights having wavelengths of red lights, the second light receiving element receives the lights coming from the specific space via a green filter that mainly transmits the near infrared lights and the lights having wavelengths of green lights, the third light receiving element receives the lights coming from the specific space via a blue filter that mainly transmits the near infrared lights and the lights having wavelengths of blue lights, and each of the red light, the green light, and the blue light is one of three primary colors of light, and the intensity of the lights including the visible lights and the near infrared lights includes the intensity of the near infrared lights and an intensity of the visible lights, which are at least one of red lights, green lights, or blue lights, and the red light, the green light, and the blue light configure the three primary colors of light.

* * * * *